US009381453B2

(12) United States Patent
Ayers et al.

(10) Patent No.: US 9,381,453 B2
(45) Date of Patent: Jul. 5, 2016

(54) FUEL FILTER (71) Applicant: Central Illinois Manufacturing Company, Bement, IL (US)

(72) Inventors: Jeffrey Alan Ayers, Decatur, IL (US); Matthew David Valentine, Bement, IL (US); Vickie Lynn Conlin, Arthur, IL (US)

(73) Assignee: Central Illinois Manufacturing Company, Bement, IL (US)

( * ) Notice: Subject to any disclaimer, the term of this patent is extended or adjusted under 35 U.S.C. 154(b) by 0 days.

(21) Appl. No.: 14/931,514

(22) Filed: Nov. 3, 2015

(65) Prior Publication Data
US 2016/0129376 A1 May 12, 2016

Related U.S. Application Data (60) Provisional application No. 62/076,004, filed on Nov. 6, 2014, provisional application No. 62/190,104, filed on Jul. 8, 2015.

(51) Int. Cl.
*B01D 29/21* (2006.01)
*B01D 29/58* (2006.01)
(Continued)

(52) U.S. Cl.
CPC .............. *B01D 29/60* (2013.01); *B01D 29/216* (2013.01); *B01D 29/58* (2013.01); *B01D 35/005* (2013.01);
(Continued)

(58) Field of Classification Search
CPC ...... B01D 27/10; B01D 27/101; B01D 27/14; B01D 27/146; B01D 27/148; B01D 29/11; B01D 29/15; B01D 29/21; B01D 29/216; B01D 29/33; B01D 29/333; B01D 29/56; B01D 29/58; B01D 29/60; B01D 35/005; B01D 35/02; B01D 35/027; B01D 35/0273; B01D 35/0276; B01D 35/14; B01D 35/143; B01D 2201/12; B01D 2201/31; B01D 2201/313; B01D 2201/316; B01D 2239/06; B01D 2239/065; B01D 2239/0654; B01D 2239/069; B01D 39/04; B01D 39/06; B67D 7/76; B67D 7/766; B67D 2007/0444; B67D 2007/0446; B67D 2007/0448; B67D 2007/0449; B67D 2007/0453; B67D 2210/0001; B67D 2210/00005; F02M 37/22; F02M 37/221; F02M 37/228; F02M 2700/438
USPC ............ 210/85, 96.1, 172.1–172.4, 337, 338, 210/437–440, 443, 450, 483, 493.1, 493.5, 210/497.01, 503–508; 222/23, 189.06, 222/189.1, 189.11, 251
See application file for complete search history.

(56) References Cited

U.S. PATENT DOCUMENTS 2,937,143 A * 5/1960 Goren .................... C02F 1/5263
127/50
3,187,895 A 6/1965 Pall et al.
(Continued)

FOREIGN PATENT DOCUMENTS

| CA | 1167774 | 5/1984 |
| WO | 2008/023029 | 2/2008 |
| WO | 2014/164163 | 10/2014 |

OTHER PUBLICATIONS

Phase Separation in Ethanol Blended Gasoline's, LCBA Marketing Group, 2008.
(Continued)

*Primary Examiner* — Joseph Drodge
(74) *Attorney, Agent, or Firm* — Michael Stanley Tomsa; McAndrews, Held & Malloy, Ltd.

(57) ABSTRACT

A fuel filter comprises a filter housing, a filter assembly positioned within said filter housing, a fuel inlet adapted to receive fuel into the filter housing, and a fuel outlet. The filter assembly may have a first end cap, a second end cap, and a filter element positioned therebetween. The filter element may comprise a particulate filter component and a water sensing component, the water sensing component having a center tube, a water sensing layer, and a screen. The water sensing layer may wrap around at least a portion of the center tube and be secured in place by the screen. The water sensing layer comprises a gelling and thickening agent, such as methyl hydroxyethyl cellulose. In operation, the fuel filter is configured to direct fuel received at the fuel inlet to the fuel outlet by way of the water sensing component and the particulate filter component.

27 Claims, 6 Drawing Sheets

(51) Int. Cl.
B01D 29/60 (2006.01)
B01D 35/14 (2006.01)
B01D 39/04 (2006.01)
B67D 7/76 (2010.01)
F02M 37/22 (2006.01)
B01D 35/00 (2006.01)
B01D 35/143 (2006.01)

(52) U.S. Cl.
CPC .............. *B01D 35/143* (2013.01); *B01D 39/04* (2013.01); *B67D 7/766* (2013.01); *F02M 37/22* (2013.01); *F02M 37/221* (2013.01); *B01D 2239/065* (2013.01)

(56) References Cited

U.S. PATENT DOCUMENTS

| | | | |
|---|---|---|---|
| 3,314,809 A * | 4/1967 | Klug | C08B 1/08 106/179.1 |
| 3,572,510 A * | 3/1971 | Lyda | B01D 17/0202 210/502.1 |
| 4,145,285 A * | 3/1979 | Martin | B01D 35/153 210/100 |
| 4,372,847 A | 2/1983 | Lewis | |
| 4,485,011 A * | 11/1984 | Cole | B01D 29/15 210/100 |
| 4,539,107 A | 9/1985 | Ayers | |
| 4,557,829 A | 12/1985 | Fields | |
| 4,588,500 A * | 5/1986 | Sprenger | B01D 17/0202 210/100 |
| 4,604,205 A | 8/1986 | Ayers | |
| 4,618,388 A | 10/1986 | Ayers | |
| 4,623,560 A | 11/1986 | Ayers | |
| 4,832,844 A | 5/1989 | Ayers | |
| 4,851,118 A | 7/1989 | Kurihara | |
| 4,892,667 A * | 1/1990 | Parker, III | B01D 17/0208 210/241 |
| 5,091,086 A | 2/1992 | Stengaard | |
| 5,298,160 A | 3/1994 | Ayers et al. | |
| 5,672,277 A | 9/1997 | Parker et al. | |
| 6,645,373 B2 | 11/2003 | Gruca | |
| 6,926,827 B2 | 8/2005 | Gruca et al. | |
| 7,008,465 B2 * | 3/2006 | Graham | A47L 9/122 210/493.5 |
| 7,175,761 B2 | 2/2007 | Stanhope et al. | |
| 7,948,376 B2 | 5/2011 | DeLine | |
| 8,187,474 B2 | 5/2012 | Freeman et al. | |
| 2003/0085165 A1 * | 5/2003 | Shane | B01D 29/111 210/85 |
| 2010/0096304 A1 | 4/2010 | Gänswein et al. | |
| 2013/0327699 A1 * | 12/2013 | Gaenswein | B01D 29/58 210/335 |

OTHER PUBLICATIONS

Gel, Wikipedia definition, https://en.wikipedia.org/wiki/Gel, downloaded Oct. 23, 2015.
Superabsorbent polymer, Wikipedia definition, https://en.wikipedia.org/wiki/Superabsorbent_polymer, downloaded Oct. 23, 2015.
Birch, Brent L., Fuel Dispensing Filtration IFC 08-015, Southwest Research 8th International Filtration Conference.
ITW Dynatec Innovative Laminated Plate Technology (LPT) Produces Uniform Fiber Deposition (UFD), downloaded Oct. 28, 2015.
Hot Melt Polyamides Arizona Chemical, downloaded Oct. 28, 2015.
Tylose® MHS 150003 P4 Technical Sheet, SE Tylose GmbH & Co.KG, dated May 2013.

* cited by examiner

FUEL FILTER

CROSS REFERENCE TO RELATED APPLICATIONS

This application claims priority to U.S. Provisional Patent Application No. 62/076,004, filed on Nov. 6, 2014, and U.S. Provisional Patent Application No. 62/190,104, filed on Jul. 8, 2015, each of which is hereby incorporated by reference in its entirety.

TECHNICAL FIELD

The present invention relates to fuel filters and, more particularly, to fuel filters for filtering particulate contaminant from a fuel stream to be used in fuel dispensing applications. More specifically, the present invention relates to fuel filters that detect liquid contaminates by reacting with free or emulsified water in fuel. For example, to identify alcohol blended fuel that is subject to a phase separation condition.

BACKGROUND

It is often desirable to filter liquid to mechanically separate impurities from the liquid prior to use, that is, separating particulate material from the liquid. For example, in the case of fuel, such material can plug carburetor jets (or injection nozzles) and otherwise interfere with the operation of an internal combustion engine. Thus, fuel is typically filtered at the time it is dispensed at, for example, a service station, and is filtered again just prior to its use by a fuel filter associated with an internal combustion engine. While such filters adequately rid the fuel of particulate contaminants by mechanical filtering, such filters permit liquid contaminants to remain with the fuel. Example fuel filters include those by Cim-Tek® Filtration, which are available from Central Illinois Manufacturing Company of Bement, Ill.

A particularly troubling fuel contaminant is water, especially in alcohol-blended fuels. To provide background, alcohols are often added to fuel to, inter alia, boost octane, oxygenate, extend fuel supply, replace ethers, and reduce the impact of fossil fuels on the carbon cycle. Alcohol-blended fuels, however, react differently in the presence of water than alcohol-free fuels. That is, with alcohol-free fuels, water is heavier than the fuel and simply drops to the bottom of the fuel tank. Thus, as long as a proper maintenance protocol is followed, the water level in the fuel tank should not reach the level of an intake for a pump that draws the fuel from the fuel tank.

Unlike alcohol-free fuels, however, alcohol-blended fuels separate into two or more layers when exposed to excess water. The two or more layers typically include a denser, alcohol-water layer, and a less dense, fuel layer that is depleted in octane rating and alcohol soluble hydrocarbons. This separation is more commonly known as phase separation, or a phase separation condition. For example, ethanol-blended fuels (a common type of alcohol-blended fuel) contain ethanol, which is hygroscopic, meaning that it seeks out, and retains, water. At low water level concentrations, the ethanol is able to retain the water it has dissolved and remain associated with the fuel. That is, the fuel, water, and alcohol mixture remains stable and usable as a motor fuel. Once the water concentration exceeds a temperature-dependent threshold (e.g., the saturation point) for a given alcohol concentration, fuel-hydrocarbon content, and additives in the fuel (which typically contain alcohol as a major component), the ethanol and water phase separates from the fuel mixture. Under average temperature conditions in the United States, for example, water content of 0.3% to 0.5% by volume is typically a range within which phase separation occurs. The alcohol-water layer does not support combustion in a conventional gasoline engine, such as those in vehicles and generators, and, if introduced to the engine, may cause malfunction of internal combustion (e.g., engine stalling). Water may also damage expensive engine components, particularly fuel injectors.

To address phase separation concerns, developments have been made to treat fuel that has succumbed to phase separation prior to delivery from the storage tank to the engine. For example, commonly owned U.S. Pat. No. 8,439,984 to Kevin Dewayne Hughes, which was filed Apr. 14, 2009, discloses a method of treating a fuel to reverse phase separation. The method involves adding a liquid to the fuel to reverse the phase separation of the alcohol-water layer. Similarly, commonly owned U.S. Pat. Nos. 4,604,205; 4,623,560; 4,832,844; 4,539,107; 4,618,388; and 5,298,160, each to William R. Ayers et al., disclose filters, and filter media for use in a filter, that separate water and/or particulate material from a liquid to be purified, such as a hydrocarbon fuel.

Despite the forgoing techniques, a need remains for an improved, more effective, apparatus, such as a filter, that can detect excess water in fuel (indicating potential phase separation in a fuel, such as alcohol-blended fuels) and, in certain aspects, inhibiting delivery of such fuel to an engine, thereby mitigating damage to the engine. In at least one aspect, such a filter would be useful in fuel dispensers, such as those found at convenience stores and fuel stations. The filter, however, may also be used in applications other than fuel dispensers, such as being directly coupled to an engine.

SUMMARY OF THE INVENTION

The present invention is directed to a filter configured to detect water in fuel, detect phase separation in fuels (e.g., alcohol-blended fuels), and restrict the fuel flow through the filter upon detection, thereby alerting the operator that there is an issue with the fuel that needs to be addressed.

According to a first aspect, a fuel filter comprises: a filter housing; a filter assembly positioned within said filter housing, the filter assembly having a first end cap, a second end cap, and a filter element positioned therebetween, wherein the filter element comprises a particulate filter component and a water sensing component, the water sensing component having a center tube, a water sensing layer, and a screen, wherein the water sensing layer wraps around at least a portion of the center tube and is secured in place by the screen, and wherein the water sensing layer comprises methyl hydroxyethyl cellulose; a fuel inlet adapted to receive fuel into the filter housing; and a fuel outlet, wherein the fuel filter is configured to direct fuel received at the fuel inlet to the fuel outlet by way of the water sensing component and the particulate filter component.

According to a second aspect, a fuel filter comprises: a filter housing having a fuel inlet and a fuel outlet, wherein the fuel inlet is adapted to receive fuel into the filter housing and the fuel outlet is adapted to expel fuel from the filter housing; a particulate filter component positioned within said filter housing; and a water sensing component positioned within said filter housing, the water sensing component comprising a water sensing layer and a center tube, the water sensing layer comprising methyl hydroxyethyl cellulose and being wrapped around at least a portion of the center tube.

According to a third aspect, a method of detecting water in a fuel supply comprises the steps of: receiving an amount of fuel at a fuel inlet of a fuel filter; passing said amount of fuel from the fuel inlet through a particulate filter component; passing said amount of fuel from the particulate filter component through a water sensing component, wherein the water sensing component comprises a fiberglass wrap material impregnated with methyl hydroxyethyl cellulose; and passing at least a portion of said amount of fuel from the water sensing component to a fuel outlet of the fuel filter.

According to a fourth aspect, a fuel filter comprises: a filter housing having a fuel inlet and a fuel outlet; a particulate filter component positioned within said filter housing; and a fiberglass laminate positioned within said filter housing, the fiberglass laminate comprising two layers of fiberglass having a gelling and thickening agent dispersed therebetween, wherein the gelling and thickening agent comprises at least one of methyl hydroxyethyl cellulose, methyl hydroxypropyl cellulose, sodium polyacrylamide, or sodium polyacrylate.

In certain aspects, the particulate filter component comprises a fiberglass material laminated to a cellulose backing layer.

In certain aspects, the cellulose backing layer is formed in a pleated configuration.

In certain aspects, the water sensing layer is a fiberglass laminate.

In certain aspects, the fiberglass laminate comprises two or more layers of fiberglass having methyl hydroxyethyl cellulose dispersed therebetween.

In certain aspects, the methyl hydroxyethyl cellulose is dispersed at a ratio of about 40 to 70 grams per square foot of fiberglass laminate.

In certain aspects, the methyl hydroxyethyl cellulose is dispersed at a ratio of about 55 grams per square foot fiberglass laminate.

In certain aspects, the water sensing component and particulate filter component are cylindrical.

In certain aspects, the water sensing component and particulate filter component are concentric with regard to one another.

In certain aspects, the fuel outlet is a threaded hole configured to engage a fuel system.

In certain aspects, the fuel inlet comprises a plurality of holes arranged around said threaded hole.

In certain aspects, the water sensing component a screen securing the water sensing layer around the center tube.

In certain aspects, the fuel filter is configured to direct fuel received from the fuel inlet to the fuel outlet by way of the water sensing component and the particulate filter component.

In certain aspects, the fuel filter is operatively coupled to a fuel dispenser, the fuel dispenser comprising (1) a fuel dispensing apparatus operatively coupled to a fuel tank and (2) a nozzle operatively coupled to said fuel dispensing apparatus, wherein said fuel dispensing apparatus is configured to direct fuel from said fuel tank to said nozzle via said fuel filter.

DESCRIPTION OF THE DRAWINGS

These and other advantages of the present invention will be readily understood with the reference to the following specifications and attached drawings, where like reference numbers refer to like structures. The figures are not necessarily to scale, emphasis is instead placed upon illustrating the principles of the devices, systems, and methods described herein.

FIG. 1b illustrates an exploded perspective view of the example filter of FIG. 1a.

FIG. 2b illustrates a cross-sectional side assembly view of the example filter of FIG. 1a.

DETAILED DESCRIPTION

Preferred embodiments of the present invention will be described herein with reference to the accompanying drawings. In the following description, well-known functions or constructions are not described in detail because they could obscure the invention in unnecessary detail.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein is merely intended to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms. Further, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

As will be described below, a filter in accordance with an aspect of the present invention detects the presence of water in a fuel, which may be indicative of phase separation in, inter alia, alcohol-blended fuels. Upon detection, the filter restricts the flow of fuel through the filter. This function may be achieved through the use of a water and/or phase separation sensing chemical within the filter. Specifically, when a mixture of water and fuel passes through the filter's water sensing layer, the water and phase separation sensing chemical (e.g., a gelling and thickening agent) reacts with the water to form an semi-impermeable or impermeable barrier that restricts the flow of fuel to the fuel delivery system, thereby alerting the operator that there is an issue with the fuel and mitigating potential engine damage. In addition to water and phase separation detection, the filter also provides particulate filtration of the fuel via a filter media. Exemplary applications for such a filter include engine fuel delivery systems, such as those used in vehicles, and fuel dispensers, such as those found at convenience stores, fuel stations, and/or fuel storage containers.

Vehicles (or other engine-driven devices) and fuel dispensers typically employ a fuel tank for holding fuel, while fuel dispensers further comprise a fuel nozzle. A fuel dispenser may comprise a head component containing a mechanical device or embedded computer, which are configured to, inter alia, control the action of the pump, drive the pump's displays, and, in certain aspects, communicate to an indoor sales system. The fuel dispenser may further comprise a pumping component having, for example, an electric motor, pumping unit, meters, pulsers and valves to physically pump and control the fuel flow from a fuel tank to a fuel nozzle. An example fuel dispenser is disclosed by U.S. Pat. No. 7,948,376 to Jonathan E. DeLine, entitled "Fuel Dispenser." A vehicle, on the other hand, employs a fuel pump that pumps fuel from the fuel tank to the engine (e.g., carburetor or injection nozzles). A filter in accordance with the present disclosure may be positioned inline between the fuel tank and the fuel nozzle or the engine. For example, the filter 100 may be position between the pump and the nozzle of a fuel dispenser or between the pump and the engine of a vehicle (or other engine-driven device).

With reference to the figures, an example filter 100 is illustrated that is capable of detecting water in fuel, which is indicative of fuel phase separation (e.g., in alcohol-blended fuels), and restricting flow thereof. Depending on the design needs, the filter 100 may be fabricated in various sizes. That is, the diameter of the filter 100 may be adjusted to achieve a desired target flow rate, while the length and/or diameter may be increased to increase the surface area of the filter material, thereby including dirt holding capacity and service life of the filter 100. For example, the outer dimensions may be about 3 to 5 inches in diameter and about 5 to 11 inches in length. Upon detection of water, the filter 100's water sensing wrap 122 restricts the fuel flow through the filter 100 so as to alert the operator that a fuel issue exists and must be addressed. The filter 100 further provides particulate filtration of the fuel. As alluded to above, particulate contamination of fuels and alcohol-blended fuel can cause, among other things, dispenser meter wear, engine damage, etc.

Figure 1A:
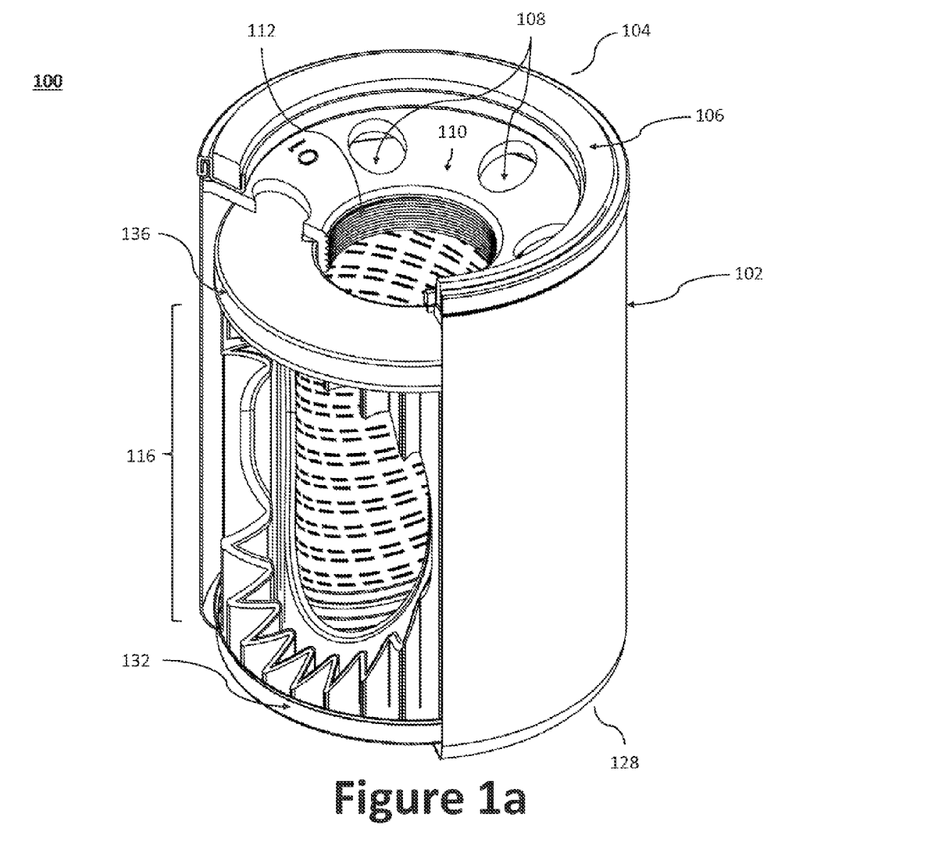
FIG. 1a illustrates a perspective view of an example filter having portions thereof removed to expose filter components within housing.
Figure 1B:
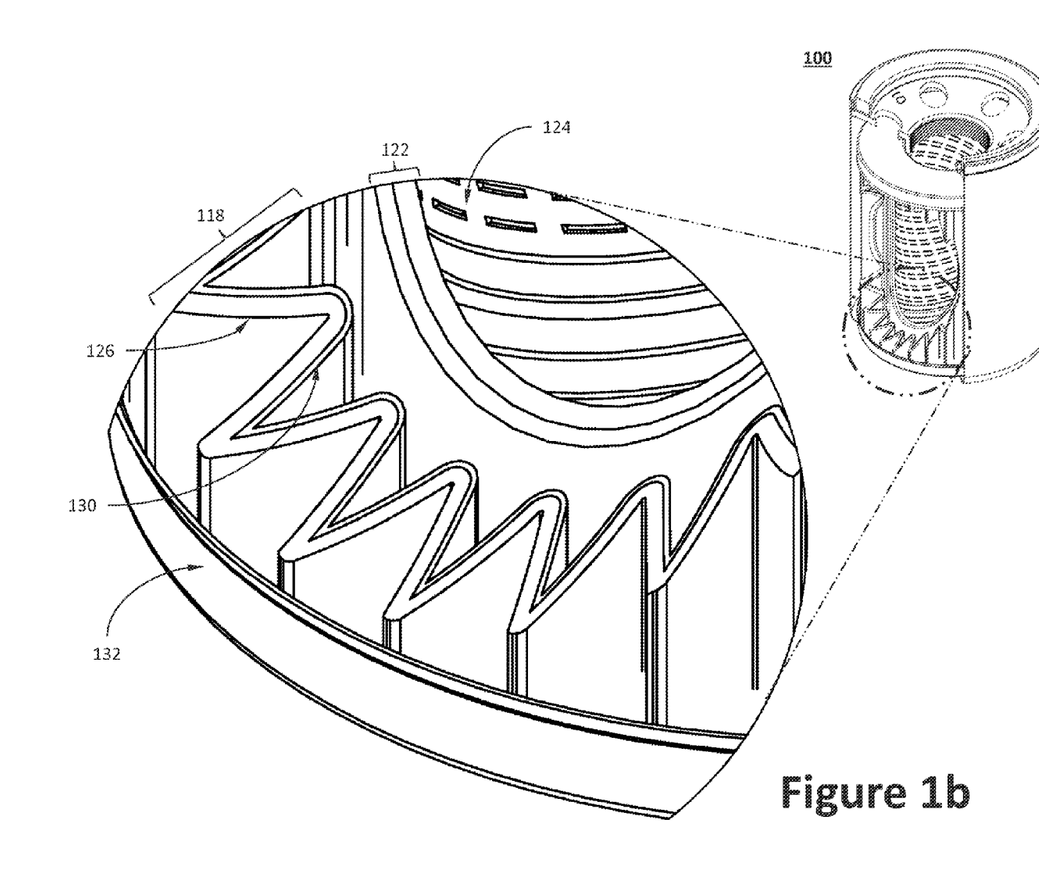

FIGS. 1a and 1b illustrate, respectively, a perspective view of a filter 100 having portions thereof removed to expose the filter components within housing 102, and an exploded perspective view thereof. As illustrated, the filter 100 may comprise a housing 102 having an open end 104 and a closed end 128. The housing 102 may be configured to receive a filter assembly, the filter assembly generally comprising a closed end cap 132, an open end cap 136, and a filter element 116 positioned therebetween. While the filter element 116, and component thereof, are illustrated as being generally cylindrical, other shapes and designs are contemplated. To secure the filter assembly within the housing 102, a threaded end plate 110 may be coupled to the open end 104 of the housing 102. The threaded end plate 110 may be coupled to the housing 102 using one or more fixed securing techniques, including, for example, crimping, adhesives, welding, rivets, etc., or removable securing techniques (e.g., threadedly coupled).

The threaded end plate 110 may comprise a threaded hole 112 positioned at an approximate center of a circular plane defined by the top surface of the threaded end plate 110. A plurality of holes 108 (e.g., about 2 to 10, more preferable about 2 to 8, most preferable about 6) are further arranged around the threaded hole 112. In operation, the plurality of holes 108 serve as a fuel inlet to the filter 100, while the threaded hole 112 in the end plate 110 serves as a fuel outlet. Preferably, the area of the threaded hole 112's opening is equal to, or greater than, the cumulative area of the plurality of holes 108's openings so as to ensure that the outlet can accommodate fuel flow from the inlet. The threaded hole 112 may be sized and configured to couple to a fuel delivery system, whether a fuel dispenser or engine. An external seal 106 is further provided along the top circumference of the open end 104, which allows the filter housing 102 to form a fluid tight seal with a corresponding mating component of the fuel delivery system. While the plurality of holes 108 serve as the fuel inlet to the filter 100 in the illustrated example, one of skill in the art would appreciate that other configurations are possible. For example, the threaded hole 112 may function as the inlet, and the plurality of holes 108 may function as the outlet. Thus, the subject teachings need not be limited to a particular arrangement.

In certain aspects, the housing 102 may be fabricated from a fuel resistant material (e.g., metal, thermoplastic, or other resin), which may be further resistant to ultraviolet (UV) light. For example, the housing 102 may be fabricated using cold rolled carbon steel, which may be further painted or powder coated. In certain aspects, however, the housing 102 may be fabricated from one or more other non-corrosive metallic materials. When a metallic material is not desirable, an example non-metallic fuel resistant material includes, for example, BASF Ultramid 8233GHS BK 102.

Figure 2A:
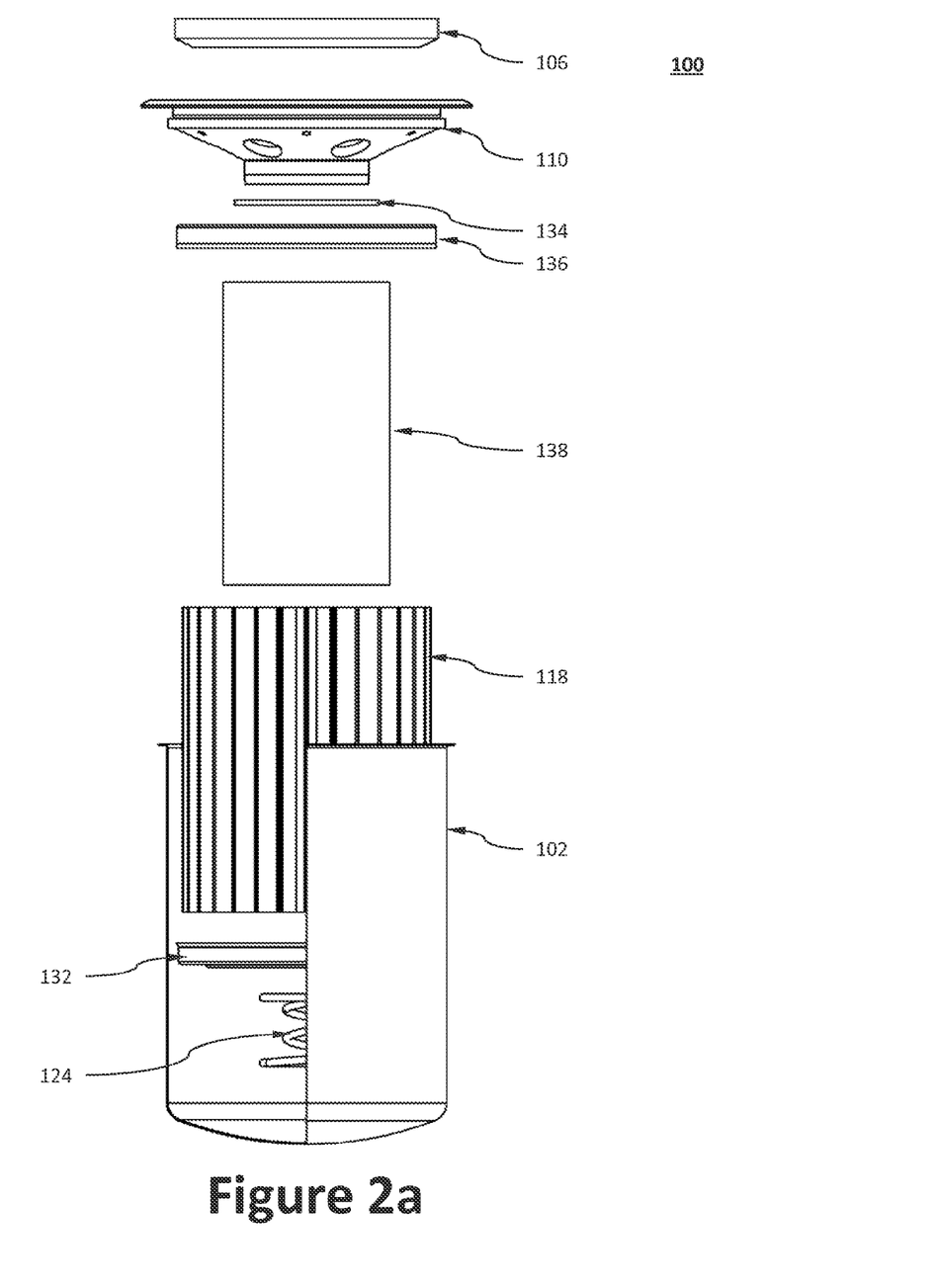
FIG. 2a illustrates a side assembly view of the example filter of FIG. 1a having portions thereof removed to expose filter components within housing.
Figure 2B:
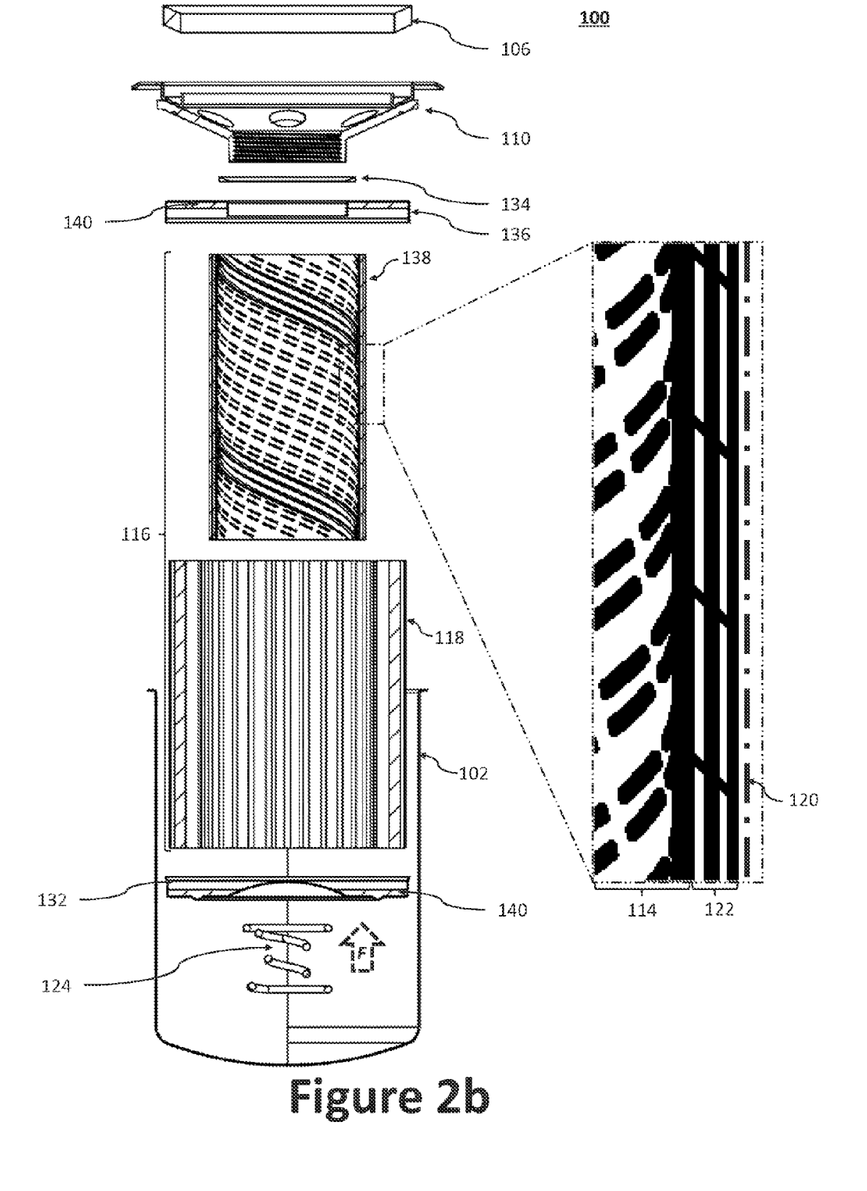

FIGS. 2a and 2b illustrate, respectively, a side assembly view of the filter 100 having portions thereof removed and a cross-sectional side assembly view of the filter 100. As illustrated, the filter element 116 may be positioned within the housing 102 and held against the threaded end plate 110 by a force (direction F), which may be imparted by a spring 124 positioned at the closed end 128 of the housing 102 and configured to act upon the closed end cap 132. At the open end of the filter element 116, a seal 134 is provided and placed between the end plate 110 and the open end cap 136. The seal 134 prevents unfiltered fuel from passing between the open end cap 136 on the filter element 116 and the end plate 110.

The spring 124 is sized and shaped to provide the pressure needed to compress the seal 134 adequately so as to form a fluid tight seal between the open end cap 136 and the end plate 110. The spring 124 may be fabricated from a corrosion-resistant material, such as 302 stainless steel. The external seal 106 and seal 134 may be fabricated from a fuel resistant flexible material. Example fuel resistant materials include, without limitation, fuel resistant Nitrile rubber (also known as buna rubber), fluoroelastomer materials (e.g., a viton compound), etc. The fuel resistant flexible material's hardness may be, for example, about 50 to 100 durometer shore A, more preferably about 70 durometer shore A.

The closed end cap 132 and open end cap 136 may secure the various components of the filter element 116 using, for example, a potting compound 140 such as plastisol. Plastisol is a suspension of polyvinyl chloride (PVC) particles in a liquid plasticizer. Plastisol flows as a liquid and can be poured into a heated mold, where the plastic and plasticizer mutually dissolve each other to yield a flexible, permanently plasticized solid product upon cooling.

The filter element 116 may comprise a particulate filter component 118, and a water sensing component 138. The water sensing component 138 may be generally cylindrical and may comprise a water sensing layer 122 supported by a cylindrical center tube 114 (e.g., a louvered or perforated support tube or core). The water sensing layer 122 may be used to detect and/or identify phase separation by detecting water present in the fuel. The center tube 114 may be fabricated from metal and configured to provide structural support for both the particulate filter component 118 and water sensing layer 122. In operation, fuel passing through the center tube 114 exits through the threaded hole 112 (which functions as a fuel outlet) in the end plate 110 and continues through the fuel delivery system.

The particulate filter component 118 may comprise, for example, a fiberglass material 126 (or another filtering material) laminated to a cellulose backing layer 130, which may be formed in a pleated configuration to increase surface area. As illustrated, the particulate filter component 118 may be generally cylindrical and configured to receive the water sensing component 138. When assembled, the various components for the filter 100, including the particulate filter component 118 and water sensing component 138, may be concentric.

The particulate filter component 118 provides particulate filtration for the fuel as the fuel flows inwardly (i.e., towards the center tube 114) through the particulate filter component 118. While certain embodiments are shown and described, it is to be understood that other configurations, such as a spirally wrapped mat or batt configuration, may be employed. In an alternate design, the fiberglass material and cellulose media may be substituted with a different particulate filter media, such as cellulose only or epoxy coated aluminum screen wire mesh supported fiberglass. This layer may also be constructed of other materials that provide suitable particulate only filtration. Examples include, for example, melt blown and other non-woven glass media, cellulose/glass combination (or hybrid) media, wet laid non-woven media, felt, or other depth type filtration media.

The water sensing layer 122 may comprise, for example, two or more layers of fiberglass having a gelling and thickening agent dispersed, or impregnated, therein or therebetween. A suitable gelling and thickening agents include, without limitation, methyl hydroxyethyl cellulose, which is a gelling and thickening agent derived from cellulose. Methyl hydroxyethyl cellulose is sometimes referred to as 2-hydroxyethyl methyl cellulose, 2-hydroxyethyl methyl ether, or hydroxyethyl methyl cellulose. Suitable methyl hydroxyethyl cellulose is includes Tylose® MHS 150003 P4, available from ShinEtsu Tylose GmbH & Co.KG.

The fiberglass wrap material may be a fiberglass-cellulose laminate. A fiberglass-cellulose laminate can be advantageous over cellulose mechanical filtering material because a fiberglass-cellulose laminate provides a higher particulate retaining capacity, therefore resulting in a longer lifespan when used with particulate-contaminated fuels. The fiberglass-cellulose laminate may be fabricated from two or more layers of fiberglass-cellulose. The two or more layers of fiberglass-cellulose may be laminated together using a hot-melt adhesive resin. The hot-melt adhesive resin may be a polyamide, such as Arizona Chemical Uni-Rez™ 2626, or other suitable hot-melt adhesive resin with resistance to fuels. The hot-melt adhesive resin can be melted and sprayed, or otherwise applied, between the two or more layers of fiberglass-cellulose. The hot-melt adhesive resin can sprayed using a fiberized spray applicator or similar device. A suitable fiberized spray applicator includes Dynatec's UFD fiberized spray applicators, available from Illinois Tool Works. Prior to the adhesive curing/solidifying, the two or more layers of fiberglass-cellulose are pressed together. Once the adhesive solidifies, the laminated material may be processed as one laminated component material. Alternatively, in lieu of a hot-melt adhesive resin, a liquid or other suitable adhesive may be used.

The methyl hydroxyethyl cellulose may be provided between two layers of fiberglass (a fiberglass laminate or fiberglass-fiberglass laminate) or, in another aspect, a layer of fiberglass and a layer of cellulose (a fiberglass-cellulose laminate). The methyl hydroxyethyl cellulose, for example, may be applied in a granular powder form, to form a thin layer to the top of one side of a layer of fiberglass wrap material. A fine mist of water, or other fluid, may be applied to the layer of methyl hydroxyethyl cellulose powder prior adding a second layer of fiberglass wrap material. The fine mist of water reacts with the methyl hydroxyethyl cellulose and binds the two layers of fiberglass wrap material together in a fashion suitable for further processing into a finished filter 100. The fine mist of water applied in this process naturally evaporates out of the methyl hydroxyethyl cellulose under normal ambient conditions. Alternative methods of applying methyl hydroxyethyl cellulose include, for example, creating a slurry of water and methyl hydroxyethyl cellulose that may be sprayed onto a substrate, such as a layer of fiberglass wrap material, prior to combination with a second layer of fiberglass wrap material. A disadvantage of this approach, however, is that such a process could require energy (e.g., heat) to dehydrate the methyl hydroxyethyl cellulose prior to further processing. In certain aspects, the methyl hydroxyethyl cellulose may be applied in other forms, rather than granular powder form. For example, the methyl hydroxyethyl cellulose may be applied as a fiber or film form between the two or more layers of fiberglass wrap material.

The methyl hydroxyethyl cellulose, for example, may be dispersed on the surface of a layer of fiberglass wrap material in an amount of, for example, about 10 to 100 grams, more preferably about 40 to 70 grams, and most preferably about 55 grams per square foot of fiberglass wrap material surface area. To permit even blockage, the methyl hydroxyethyl cellulose, or other gelling and thickening agent, may be evenly dispersed (or distributed) over a given layer of fiberglass wrap material's surface area. In certain embodiments, the density of the methyl hydroxyethyl cellulose granules may be greater near the outlet than near the inlet because, as the granules swell, it is desirable that their density be reduced near the inlet so as not to cause premature clogging of the filter 100 due to the swelling of the granules. Higher amounts of methyl hydroxyethyl cellulose than those prescribed above may not necessarily add to the performance of the phase separation or water detection capabilities of the filter 100, however, a reduced amount of methyl hydroxyethyl cellulose will not sufficiently restrict flow through the filter 100 to notify the operator of the presence of excess water or phase separation. That is, testing has shown that using more than the proscribed amount of methyl hydroxyethyl cellulose only adds to the cost by adding unnecessary methyl hydroxyethyl cellulose not necessarily required to restrict fluid flow through the filter in the presence of water or phase separation, but does not reduce the effectiveness of the filter's ability to the presence of excess water or phase separation.

Compared to other gelling and thickening agents, methyl hydroxyethyl cellulose has demonstrated unexpectedly beneficial results when applied to filter 100, resulting in superior flow restriction characteristics. Methyl hydroxyethyl cellulose has shown to reduce flow from 10 gallons per minute (GPM) to less than 1 GPM in about 20 or fewer seconds, a 90% reduction in flow. Starch-polyacrylonitrile graft copolymer, on the other hand, has shown to only reduce flow from 12 GPM to 2 GPM in roughly the same time period, an 83% reduction. Accordingly, a user would be more quickly alerted as to a potential phase separation condition when using methyl hydroxyethyl cellulose. Moreover, the physical characteristics of methyl hydroxyethyl cellulose are more conducive to flow restriction than known materials. For example, when a starch-polyacrylonitrile graft copolymer (or other similar material) encounters water, the material typically yields a less viscous gel, while methyl hydroxyethyl cellulose coagulates to form a singular more viscous gel material, namely a cohesive-gelatinous-substance. Finally, using methyl hydroxyethyl cellulose is more cost efficient as the cost of methyl hydroxyethyl cellulose material is lower that other, often less effective, materials, such as starch-polyacrylonitrile graft copolymer.

Other suitable gelling and thickening agents, which may be applied in a substantially similar manner to that describe above, may include, for example, methyl hydroxypropyl cellulose (which is derived from cellulose), sodium polyacrylamide, sodium polyacrylate, modified starches carrying copolymers such as polyacrylamide, and/or other water-absorbing superabsorbent polymers. Regardless of gelling and thickening agent, a filter 100 that has restricted the flow of fuel may be reused by dehydrating the hydrated gelling and thickening agent by, for example, applying heat to evaporate the water from the gelling and thickening agent. The hydrating and dehydrating cycle, however, can affect the absorption capacity of the gelling and thickening agent.

The term superabsorbent polymer refers to polymers that can absorb and retain exceptionally large amounts of liquid relative to its own mass. Water-absorbing polymers, which are classified as hydrogels when cross-linked, absorb aqueous solutions through hydrogen bonding with water molecules. A hydrogel refers to a network of polymer chains that are hydrophilic, sometimes found as a colloidal gel in which water is the dispersion medium. Hydrogels and self-healing hydrogels are highly absorbent natural or synthetic polymeric networks. A superabsorbent polymer's ability to absorb water is a factor of the ionic concentration of the aqueous solution. In deionized and distilled water, a superabsorbent polymer may absorb 500 times its weight (from 30 to 60 times its own volume) and can become up to 99.9% liquid. For example, sodium polyacrylate absorbs from 500-800 times its weight in water.

The total absorbency and swelling capacity may be controlled by the type and degree of cross-linkers used to make the gel. Low-density cross-linked superabsorbent polymers generally have a higher absorbent capacity and swell to a larger degree. These types of SAPs also have a softer and stickier gel formation. High cross-link density polymers exhibit lower absorbent capacity and swell, but the gel strength is firmer and can maintain particle shape even under modest pressure.

In the illustrated examples, the water sensing layer 122 is wrapped around a center tube 114 and secured in place by a screen 120, which may be, for example, a vinyl coated fiberglass core yarn mesh, such as a 16 mesh (0.009 in.) PVC screen. In certain aspects, however, alternative materials may be used in place of the fiberglass layers. Examples include, for example, melt blown and other non-woven glass medias, cellulose/glass combination (or hybrid) medias, wet laid nonwoven medias, felt, or other depth type filtration media. While the water sensing layer 122 is illustrated and described as being wrapped around the center tube 114, the water sensing layer 122 may alternatively be positioned elsewhere in the filter 100. For example, the water sensing layer 122 may be integrated with the particulate filter component 118, positioned within the center tube 114, over the threaded hole 112, etc. That is, a screening material that is impregnated with a thickening agent (e.g., water sensing layer) may be positioned over the inlet and/or outlet of the filter 100, in the illustrated example, over the threaded hole 112 and/or the plurality of holes 108. As the surface area defined by the inlet and/or outlet is generally less than the surface area of the center tube (or water sensing layer 112), the filter 100 may respond more quickly to the presence of water (i.e., more sensitive to blockage), thereby indicating to the operator that a phase separation condition may exist. In other aspects, the water sensing layer may be integrated, wrapped, or otherwise used with particulate filter component 118, water sensing layer 122, center tube 114, or portions/components thereof.

Figure 3A:
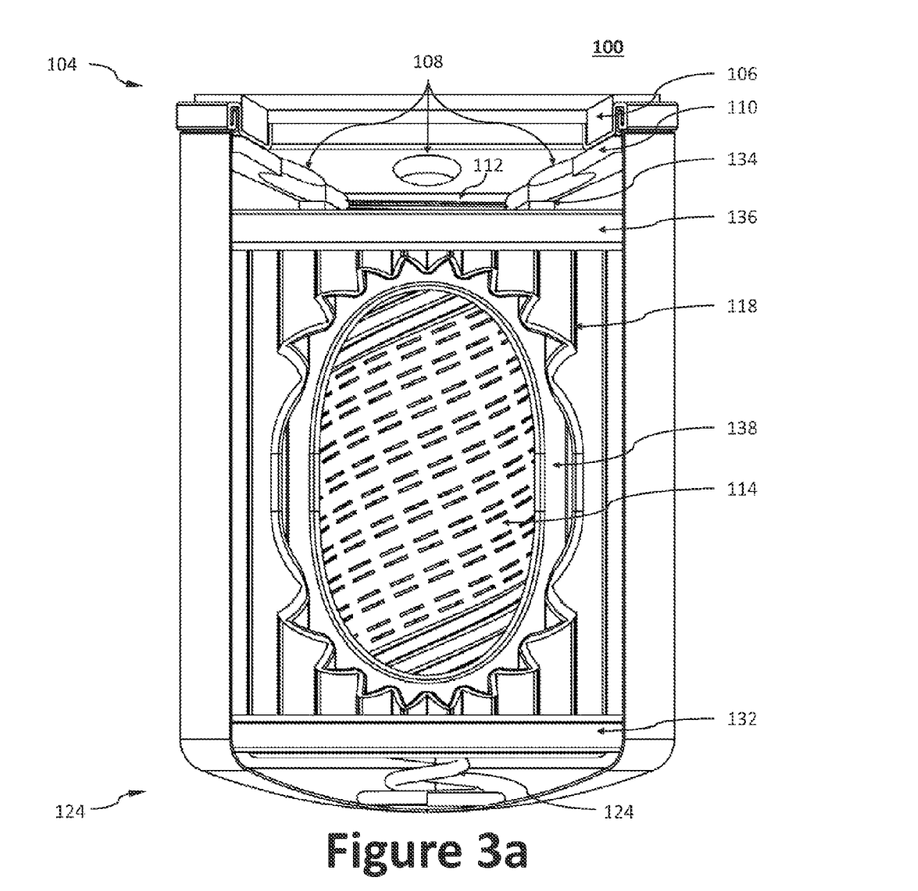
FIG. 3a illustrates a side view of the example filter of FIG. 1a having portions thereof removed to expose filter components within housing.
Figure 3B:
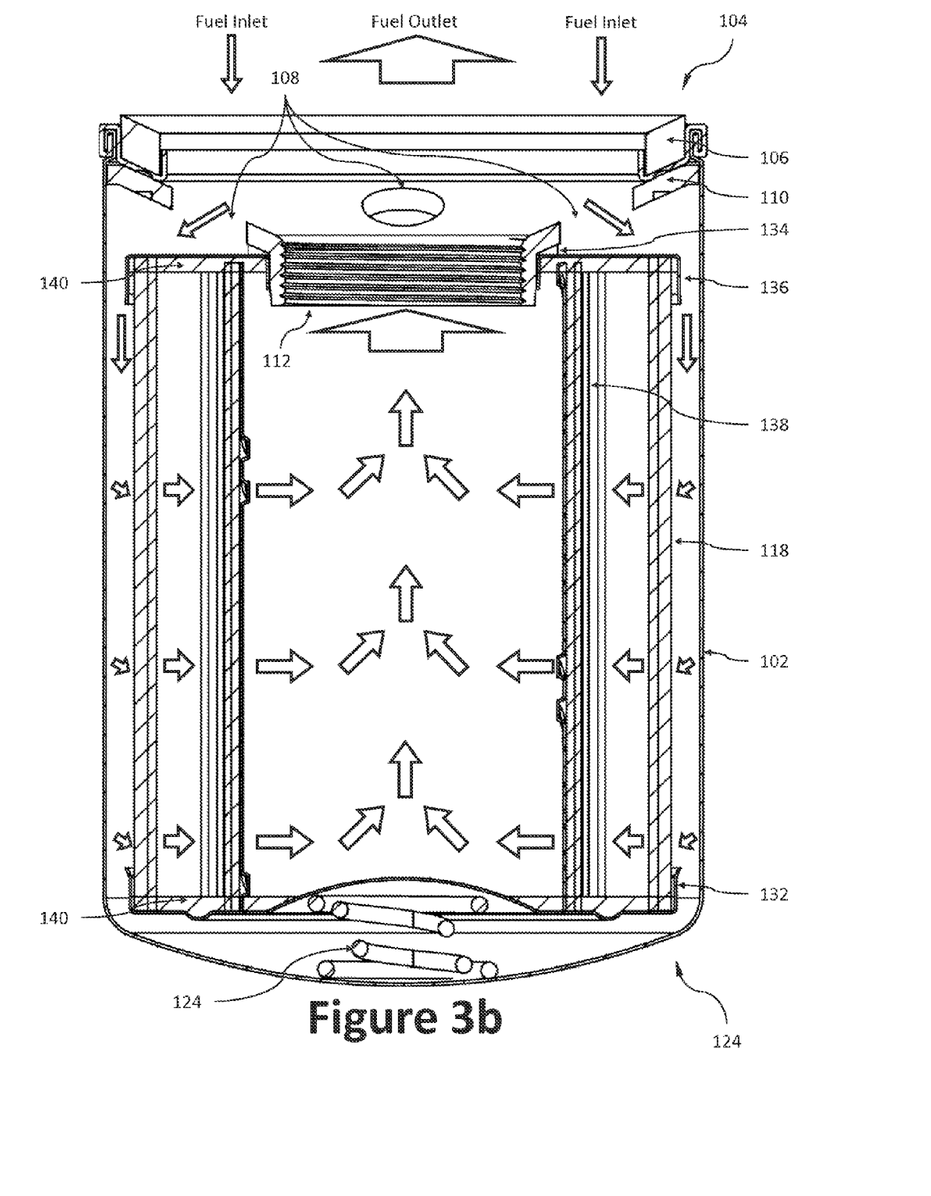
FIG. 3b illustrates a cross-sectional side view of the example filter of FIG. 1a illustrating fuel flow direction.

FIG. 3a illustrates a side view of an assembled filter 100 having portions thereof removed to expose filter components within housing, while FIG. 3b illustrates a cross-sectional side view of the example filter 100 illustrating fuel flow direction. Specifically, as indicated by the arrows, the fuel enters the filter 100 via the plurality of holes 108, which collectively function as the fuel inlet. The fuel then travels between the outer surface of the particulate filter component 118 and the inner surface of the housing 102. The fuel is then passed through the wall of the particulate filter component 118 (e.g., through fiberglass material 126 and cellulose backing layer 130), which filters out particulates. The fuel, having been filtered of particulates, then travels through the water sensing component 138 (e.g., water sensing layer 122, center tube 114, and screen 120). If present, water within the fuel (e.g., fuel subject to phase separation) reacts with the gelling and thickening agent, which will coagulate to ultimately create an impermeable barrier (or semi impermeable barrier) between the inner region of the center tube 114 and a region defined between the particulate filter component 118 and the water sensing component 138. The impermeable barrier, in turn, restricts or wholly prohibits the flow of fuel. Indeed, the degree to which the gelling and thickening agent coagulates to form an impermeable barrier (e.g., the degree in which flow of fuel is blocked) generally correlates to the amount of water that passes through the water sensing component 138. That is, the gelling and thickening agent will more quickly form the impermeable barrier as the amount of water increases. Accordingly, the filter may still operate normally when nominal amounts of water are present, but the flow of fuel will decrease as the amount of water increases, thereby indicating a phase separation condition.

Any fuel that passes through the water sensing component 138 flows to the threaded hole 112, which functions as a fuel outlet and may be coupled to a fuel delivery system. As illustrated, and as described above, the spring 124 imparts a force upon the underside of closed end cap 132, which in turn urges the filter element 116 against the seal 134, which creates a fluid tight seal between the filter element 116's open end cap 136 and the threaded end plate 110. When coupled to a fuel delivery system, the fuel inlet and the fuel outlet are not in direct flow communication as the fuel delivery system's coupling forms a barrier between the fuel inlet and the fuel outlet.

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Further, while the forgoing has been described with regard to fuel delivery systems, one of skill in the art would recognize that the techniques taught herein may be employed with other applications where water detection within a fluid is desired. Thus, it is to be understood that the invention may therefore be practiced otherwise than as specifically described above.

What is claimed is:

1. A fuel filter comprising:
   a filter housing;
   a filter assembly positioned within said filter housing, the filter assembly having a first end cap, a second end cap, and a filter element positioned between said first end cap and said second end cap,
      wherein the filter element comprises a particulate filter component and a water sensing component, the water sensing component having a center tube, a water sensing layer comprising fiberglass, and a screen,
      wherein the water sensing layer wraps around at least a portion of the center tube and is secured in place by the screen, and
      wherein the water sensing layer comprises methyl hydroxyethyl cellulose;
   a fuel inlet adapted to receive fuel into the filter housing; and
   a fuel outlet, wherein the fuel filter is configured to direct fuel received at the fuel inlet to the fuel outlet by way of the water sensing component and the particulate filter component.

2. The fuel filter of claim 1, wherein the water sensing layer is a fiberglass laminate comprising a first layer and a second layer of fiberglass, the fiberglass laminate having methyl hydroxyethyl cellulose dispersed between said first layer and said second layer.

3. The fuel filter of claim 2, wherein the methyl hydroxyethyl cellulose is dispersed at a ratio of about 40 to 70 grams per square foot of fiberglass laminate.

4. The fuel filter of claim 3, wherein the methyl hydroxyethyl cellulose is dispersed at a ratio of about 55 grams per square foot of fiberglass-laminate.

5. The fuel filter of claim 3, wherein the fuel filter is operatively coupled to a fuel dispenser, the fuel dispenser comprising (1) a fuel dispensing apparatus operatively coupled to a fuel tank and (2) a nozzle operatively coupled to said fuel dispensing apparatus, wherein said fuel dispensing apparatus is configured to direct fuel from said fuel tank to said nozzle via said fuel filter.

6. A fuel filter comprising:
   a filter housing having a fuel inlet and a fuel outlet, wherein the fuel inlet is adapted to receive fuel into the filter housing;
   a particulate filter component positioned within said filter housing; and
   a water sensing component positioned within said filter housing, the water sensing component comprising a water sensing layer and a center tube, the water sensing layer comprising fiberglass and methyl hydroxyethyl cellulose and being wrapped around at least a portion of the center tube.

7. The fuel filter of claim 6, wherein the particulate filter component comprises a fiberglass material laminated to a cellulose backing layer.

8. The fuel filter of claim 7, wherein the cellulose backing layer is formed in a pleated configuration.

9. The fuel filter of claim 6, wherein the fiberglass is laminated to a cellulose backing layer, the cellulose backing layer being formed in a pleated configuration.

10. The fuel filter of claim 6, wherein the water sensing layer is a fiberglass laminate having a first layer and a second layer of fiberglass, the fiber laminate having methyl hydroxyethyl cellulose dispersed between said first layer and said second layer.

11. The fuel filter of claim 10, wherein the methyl hydroxyethyl cellulose is dispersed at a ratio of about 40 to 70 grams per square foot of fiberglass laminate.

12. The fuel filter of claim 11, wherein the methyl hydroxyethyl cellulose is dispersed at a ratio of about 55 grams per square foot of fiberglass-laminate.

13. The fuel filter of claim 6, wherein the water sensing component and particulate filter component are cylindrical.

14. The fuel filter of claim 13, wherein the water sensing component and particulate filter component are concentric with regard to one another.

15. The fuel filter of claim 6, wherein the fuel outlet is a threaded hole configured to engage a fuel system.

16. The fuel filter of claim 6, wherein the fuel inlet comprises a plurality of holes arranged around said threaded hole.

17. The fuel filter of claim 6, wherein the water sensing component comprises a screen securing the water sensing layer around at least a portion of the center tube.

18. The fuel filter of claim 6, wherein the fuel filter is configured to direct fuel received from the fuel inlet to the fuel outlet by way of the water sensing component and the particulate filter component.

19. The fuel filter of claim 6, wherein the fuel filter is operatively coupled to a fuel dispenser, the fuel dispenser comprising (1) a fuel dispensing apparatus operatively coupled to a fuel tank and (2) a nozzle operatively coupled to said fuel dispensing apparatus, wherein said fuel dispensing apparatus is configured to direct fuel from said fuel tank to said nozzle via said fuel filter.

20. A method of detecting water in a fuel supply, the method comprising the steps of:
   receiving an amount of fuel at a fuel inlet of a fuel filter;
   passing said amount of fuel from the fuel inlet through a particulate filter component;
   passing said amount of fuel from the particulate filter component through a water sensing component,
      wherein the water sensing component comprises a fiberglass wrap material impregnated with methyl hydroxyethyl cellulose; and
   passing at least a portion of said amount of fuel from the water sensing component to a fuel outlet of the fuel filter.

21. The method of claim 20, wherein the methyl hydroxyethyl cellulose is impregnated at a ratio of about 40 to 70 grams per square foot of fiberglass wrap material.

22. The method of claim 21, wherein the methyl hydroxyethyl cellulose is impregnated at a ratio of about 55 grams per square foot of fiberglass wrap material.

23. A fuel filter comprising:
   a filter housing having a fuel inlet and a fuel outlet;
   a particulate filter component positioned within said filter housing; and
   a fiberglass laminate positioned within said filter housing, the fiberglass laminate comprising a first layer and a second layer of fiberglass having a gelling and thickening agent dispersed between said first layer and said second layer,
      wherein the gelling and thickening agent comprises methyl hydroxyethyl cellulose.

24. The fuel filter of claim 23, wherein the gelling and thickening agent is dispersed at a ratio of about 40 to 70 grams per square foot of fiberglass laminate.

25. The fuel filter of claim 24, wherein the gelling and thickening agent is dispersed at a ratio of about 55 grams per square foot of fiberglass laminate.

26. The fuel filter of claim 23, wherein the fuel filter is configured to direct fuel received from the fuel inlet to the fuel outlet by way of the water sensing component and the particulate filter component.

27. The fuel filter of claim 23, wherein the fuel filter is operatively coupled to a fuel dispenser, the fuel dispenser comprising (1) a fuel dispensing apparatus operatively coupled to a fuel tank and (2) a nozzle operatively coupled to said fuel dispensing apparatus, wherein said fuel dispensing apparatus is configured to direct fuel from said fuel tank to said nozzle via said fuel filter.

* * * * *